United States Patent
Ramsay (10) Patent No.: US 8,554,895 B2
(45) Date of Patent: Oct. 8, 2013

(54) SYSTEMS AND METHODS FOR PROVIDING DUAL-CONTROL FUNCTIONALITY IN A NETWORKED DIGITAL MEDIA DEVICE

(75) Inventor: Max Gordon Ramsay, New South Wales (AU)

(73) Assignee: Tymphany Hong Kong Limited, Sausalito, CA (US)

( * ) Notice: Subject to any disclaimer, the term of this patent is extended or adjusted under 35 U.S.C. 154(b) by 445 days.

(21) Appl. No.: 12/811,297

(22) PCT Filed: Jan. 7, 2009

(86) PCT No.: PCT/AU2009/000018
§ 371 (c)(1),
(2), (4) Date: Jun. 30, 2010

(87) PCT Pub. No.: WO2009/086660
PCT Pub. Date: Jul. 16, 2009

(65) Prior Publication Data
US 2010/0293264 A1 Nov. 18, 2010

(30) Foreign Application Priority Data
Jan. 7, 2008 (AU) .............................. 2008900059

(51) Int. Cl.
*G06F 15/173* (2006.01)
(52) U.S. Cl.
USPC ........................................................ 709/223
(58) Field of Classification Search
USPC ........................................ 709/223, 249, 250
See application file for complete search history.

(56) References Cited

U.S. PATENT DOCUMENTS 5,974,237 A * 10/1999 Shurmer et al. .............. 709/224
2005/0232602 A1 * 10/2005 Kreifeldt et al. ................ 386/96
2006/0041655 A1 * 2/2006 Holloway et al. ............. 709/223
2006/0281477 A1 * 12/2006 Downes ........................ 455/509
2006/0282514 A1 * 12/2006 Saint-Hilaire et al. ........ 709/218
2008/0242222 A1 * 10/2008 Bryce et al. .................. 455/3.06
2009/0303926 A1 * 12/2009 Den Hartog et al. .......... 370/328
2010/0214948 A1 * 8/2010 Knibbe et al. ................ 370/254

FOREIGN PATENT DOCUMENTS

WO   WO 2006/090340   6/2006

OTHER PUBLICATIONS

International Search Report—2 pgs., Feb. 27, 2009, Avega Systems PTY LTD.
Xbox.com/Personalities—Windows Media Connect; http://web.archive.org/web/200612170245/www.xbox.com/en-US/community/personality/elle/20060203-pcmedial.ht m, OPI Dec. 17, 2006.

* cited by examiner

*Primary Examiner* — Abdullahi Salad
(74) *Attorney, Agent, or Firm* — Tarolli, Sundheim, Covell & Tummino LLP (57) ABSTRACT

Described herein are systems and methods for providing dual control functionality in a networked digital media device. In overview, a networked digital media device advertises a standard digital media device, which is discoverable and controllable by a standard control device in accordance with a standard media control protocol (also referred to as a Device Control Protocol, or DCP). The networked digital media device also advertises a non-standard digital media playback device, the non-standard device being discoverable and controllable by a non-standard control device in accordance with a non-standard media control protocol. These two devices are manifested in the same device hardware, essentially allowing the device to implement dual-control such that it is able to be controlled both as a standard device and a non-standard device.

19 Claims, 6 Drawing Sheets

SYSTEMS AND METHODS FOR PROVIDING DUAL-CONTROL FUNCTIONALITY IN A NETWORKED DIGITAL MEDIA DEVICE

FIELD OF THE INVENTION

The present invention relates to systems and methods for providing dual-control functionality in a networked digital media device. Embodiments of the invention have been particularly developed to allow a wireless speaker subsystem to perform advanced, non-standard, functionalities under the control of an appropriately configured control device, yet still operate in a standard manner under the control of a standard control device. While some embodiments will be described herein with particular reference to that application, it will be appreciated that the invention is not limited to such a field of use, and is applicable in broader contexts.

BACKGROUND

A networked speaker subsystem unit typically includes a central processing unit coupled to a memory unit, a networking interface and audio output hardware (such as an amplifier and one or more speaker cones). The central processing unit provides a media rendering functionality whereby data indicative of audio received via the networking interface is processed to provide a corresponding audible output via the audio output hardware. In the case of a wireless speaker subsystem, the networking interface typically implements a wireless networking standard such as the IEEE 802.11 standard.

Control of such a speaker subsystem unit is often achieved by way of a networked control device, which provides control signals directly or indirectly to the speaker subsystem unit over a network. However, to do so, the control device must first identify the speaker subsystem unit on the network, and subsequently be able to understand and implement the media control protocol used by that unit.

In an attempt to streamline cross-manufacturer interoperability between networked digital media components, such as wireless speaker subsystems and control devices, various standards have been implemented, or are in the process of development. A device conforming to a standard of this nature is typically able to be certified, with such certification essentially providing assurance to consumers that the device in question is compatible for interoperation with other similarly certified devices. A prime example is the Universal Plug and Play Audio and Video (UPnP AV) standard, supervised by the Digital Living Network Alliance (DLNA). This standard defines standard media devices, and provides a standard media control protocol for allowing interoperation between such devices.

In the course of designing a networked speaker subsystem unit, or a networked media system generally, a critical decision to be made is whether or not to aim for compliance with an existing standard, such as the UPnP AV standard. To do so typically involves sacrificing (or significantly limiting) the ability to provide various non-standard advanced functionalities. However, not doing so might lead to a poor consumer perception, or downstream consumer frustration when interoperability difficulties are experienced.

SUMMARY

Described herein are devices, systems and methods for providing dual control functionality in a digital media device, predominately for the purposes managing wireless audio systems. However, although wireless audio systems are considered as a primary example, various embodiments are equally applicable to other audio systems, particularly other networked audio systems, and networked digital media playback systems generally.

One embodiment provides a method performed by a networked digital media device for providing dual-control functionality, the method including the steps of:
(i) advertising a standard digital media playback device, the standard digital media playback device being discoverable and controllable by a standard control device in accordance with a standard media control protocol; and
(ii) advertising a non-standard digital media playback device, the non-standard device being discoverable and controllable by a non-standard control device in accordance with a non-standard media control protocol;
wherein the standard digital media playback device and the non-standard digital media playback device share common hardware.

One embodiment provides a method wherein the standard and non-standard devices are embedded devices of a root device.

One embodiment provides a method the standard digital media playback device and the non-standard digital media playback device are each advertised in accordance with a common open connectivity protocol.

One embodiment provides a method wherein the common open connectivity protocol is UPnP.

One embodiment provides a method wherein the standard media control protocol is compliant with the UPnP AV standard.

One embodiment provides a method wherein the standard device is a MediaRenderer.

One embodiment provides a method wherein the standard device is a MediaServer.

One embodiment provides a method wherein the non-standard multimedia protocol provides control access to one or more advanced services.

One embodiment provides a method wherein the one or more advanced services relate to group and/or zone interoperability.

One embodiment provides a method wherein the one or more advanced services relate to surround sound functionality.

One embodiment provides a method wherein the non-standard device is an embedded services device for encapsulating one or more non-standard UPnP services.

One embodiment provides a method wherein the one or more non-standard UPnP services relate to group and/or zone interoperability.

One embodiment provides a method wherein the one or more non-standard UPnP services relate to surround sound functionality.

One embodiment provides a method wherein the networked digital media device is a virtual device representative of a networked media system including by a plurality of distributed hardware devices.

One embodiment provides a method wherein a control signal received in accordance with the standard media control protocol is prioritised over a control signal received in accordance with the non-standard media control protocol.

One embodiment provides a method wherein a control signal received in accordance with the standard media control protocol is temporarily prioritised over one or more control signals received in accordance with the non-standard media control protocol.

One embodiment provides a method according to claim 1 including the steps of:
- (iii) receiving, in accordance with the non-standard media control protocol, a first control signal;
- (iv) being responsive to the first control signal for adopting a first state corresponding to the first control signal;
- (v) receiving, in accordance with the standard media control protocol, a second control signal;
- (vi) being responsive to the second control signal for adopting a second state corresponding to the second control signal;
- (vii) receiving, in accordance with the standard media control protocol, a third control signal indicative of an instruction to adopt a dormant state;
- (viii) being responsive to the third control signal for identifying a fourth state related to the first state; and
- (ix) selectively adopting the fourth state.

One embodiment provides a method including the steps of:
- (iii) receiving, in accordance with the non-standard media control protocol, a first control signal;
- (iv) being responsive to the first control signal for adopting a first state corresponding to the first control signal;
- (v) receiving, in accordance with the standard media control protocol, a second control signal;
- (vi) being responsive to the second control signal for adopting a second state corresponding to the second control signal;
- (vii) being responsive to a timeout condition for identifying a fourth state related to the first state; and
- (viii) selectively adopting the fourth state.

One embodiment provides a method wherein the networked media device is a networked media playback device.

One embodiment provides a method wherein the networked media playback device is a networked speaker subsystem unit.

One embodiment provides a method wherein the networked media playback device is a wireless speaker subsystem unit.

One embodiment provides a method wherein the networked media device is media server.

One embodiment provides a computer-readable medium encoded with a set of instructions that when executed by one or more processors cause the one or more processors to carry out a method as described herein.

One embodiment provides a networked digital media device for providing dual-control functionality, the device being configured to:
- (i) advertising a standard digital media playback device, the standard digital media playback device being discoverable and controllable by a standard control device in accordance with a standard media control protocol; and
- (ii) advertising a non-standard digital media playback device, the non-standard device being discoverable and controllable by a non-standard control device in accordance with a non-standard media control protocol;
- wherein the standard digital media playback device and the non-standard digital media playback device share common hardware.

One embodiment provides a media playback unit including:
- a networking interface for connecting to a computer network;
- a first processor for carrying out a discovery process on the computer network for allowing mutual discovery of the device, the none or more complementary devices, and the none or more complimentary multimedia systems;
- a second processor for advertising a standard digital media playback device, the standard digital media playback device being discoverable and controllable by a standard control device in accordance with a standard media control protocol; and
- a third processor for advertising a non-standard digital media playback device, the non-standard device being discoverable and controllable by a non-standard control device in accordance with a non-standard media control protocol.

One embodiment provides a playback unit wherein the networking interface includes a radio interface and wherein the computer network is a wireless network.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Particular embodiments may provide all, some, or none of these aspects, features, or advantages. Particular embodiments may provide one or more other aspects, features, or advantages, one or more of which may be readily apparent to a person skilled in the art from the drawings, descriptions, and claims herein.

DETAILED DESCRIPTION OF EMBODIMENTS

Described herein are systems and methods for providing dual control functionality in a networked digital media device. In overview, a networked digital media device advertises a standard digital media device, which is discoverable and controllable by a standard control device in accordance with a standard media control protocol (also referred to as a Device Control Protocol, or DCP). The networked digital media device also advertises a non-standard digital media playback device, the non-standard device being discoverable and controllable by a non-standard control device in accordance with a non-standard media control protocol. These two devices are manifested in the same device hardware, essentially allowing the device to implement dual-control such that it is able to be controlled both as a standard device and a non-standard device.

Some embodiments of the invention described herein are applicable to networked digital media devices. A networked digital media device is, in some cases, a networked digital media playback device, which is capable of rendering digital media delivered to it via a computer network. For example, the UPnP AV standard describes such a device as a MediaRenderer. In much of the description herein, wireless speakers are used as an example of a networked digital media playback device. Those of ordinary skill in the art would readily be able to modify the description provided herein that is for wireless speakers and apply the methods and apparatuses to other discrete media devices. The description is provided in terms of wireless speakers in order to keep the description simple and not obscure various significant concepts.

In some cases a networked digital media device includes a media server. For example, the UPnP AV standard describes such a device as a MediaServer. A media server includes (or is coupled to) a storage device that maintains data indicative of media, such as digital audio files. In the context of a digital media playback system, a control device (also referred to as a controller, Digital Media Controller, DMC, or control device) is used to coordinate the playback of media stored on the media server at a digital media playback device.

Some embodiments of the invention described herein are applicable to networked digital media systems. A networked digital media system is a system that allows one or more devices connected via a computer network to render digital media. In much of the description herein, a wireless audio system is used as an example of a networked digital media playback system. Those of ordinary skill in the art would readily be able to modify the description provided herein that is for a wireless audio system and apply the methods and apparatuses to other digital media playback systems. The description is provided in terms of a wireless audio system in order to keep the description simple and not obscure various significant concepts.

Figure 1:
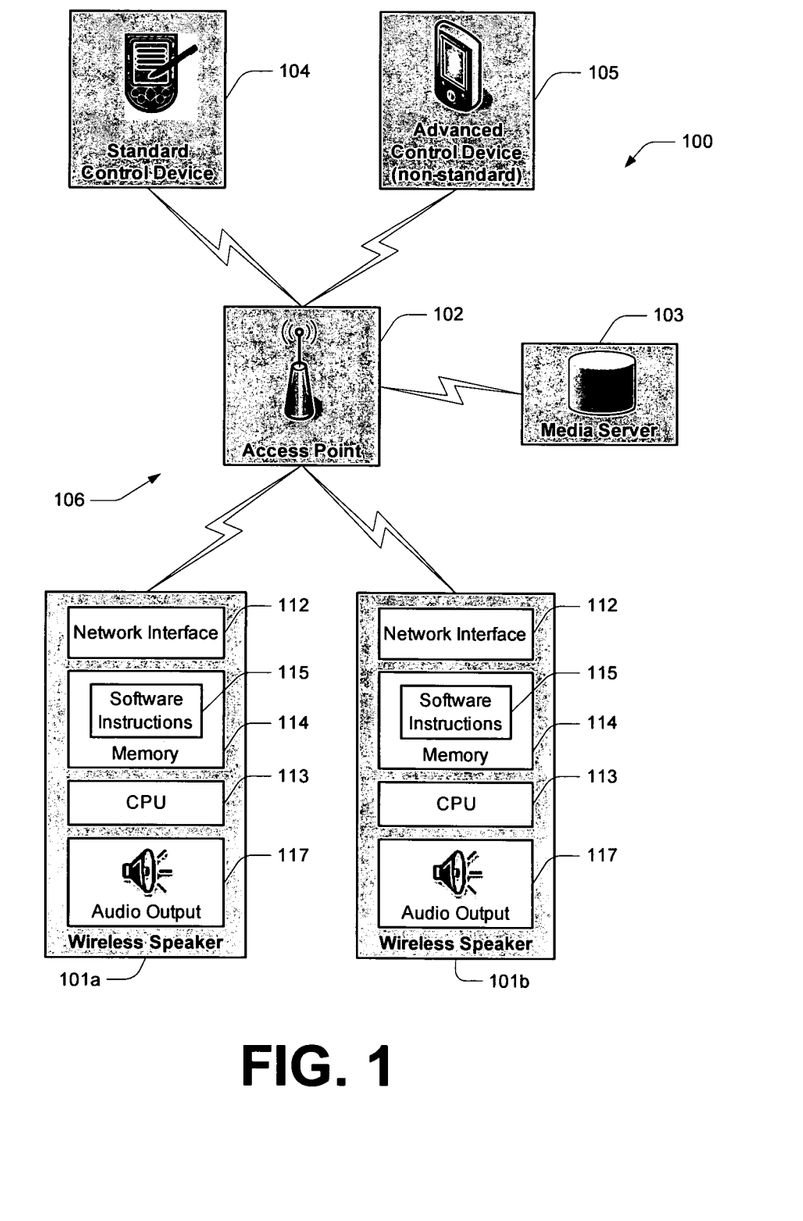
FIG. 1 shows a networked media system according to one embodiment.

FIG. 1 illustrates a basic digital media playback system 100. System 100 includes wireless speakers 101a and 101b, a wireless access point 102, a media server 103, a standard control device 104, and an advanced control device 105. In overview, these components are connected to a common wireless network 106, in the present circumstances being a wireless network in accordance with the IEEE 802.11 standard. Wireless speakers 101a and 101b are used to render and play back digital media provided by media server 103, or provided at another location on network 106. For example, in some cases media is stored on one of the control devices, or a portable media device that is connected to a networked cradle device.

Each wireless speaker 101a and 101b includes a network interface 112 for connecting to network 106, in the present example via access point 102. Data indicative of command signals is received via this network, along with data indicative of digital media for playback. A central processing unit (CPU) 113 operates in conjunction with memory 114, and is responsible for rendering content, processing command signals, and the like. Memory 114 includes software instructions 115, which, among other functions, allow wireless speakers 101a and 101b to perform various methods, including methods described herein. It is noted that not all instructions required for performing these methods need be in memory 104 at a given time. Wireless speakers 101a and 101b additionally include respective audio outputs 117 (which in some embodiments includes one or more speaker cones, or other analogue outputs such as audio jacks), for facilitating playback of rendered digital media as audio.

Control devices 104 and 105 may include 802.11 type networked remote controls, or other networked devices. For example, a control device might take the form of a portable electronic device having a 802.11 type network connection (such as a cellular phone, PDA, portable media player, or the like), purpose-built remote having a 802.11 type network connection, or a personal computer connected to network 106 and running appropriate software. In some embodiments, standard control software, such as UPnP control device software, is able to be downloaded to a device thereby to provide control device functionality. For example, in some embodiments control device software is downloaded to an MP3 player, such that the MP3 player is able to coordinate playback of locally stored media via networked media playback devices.

Figure 2:
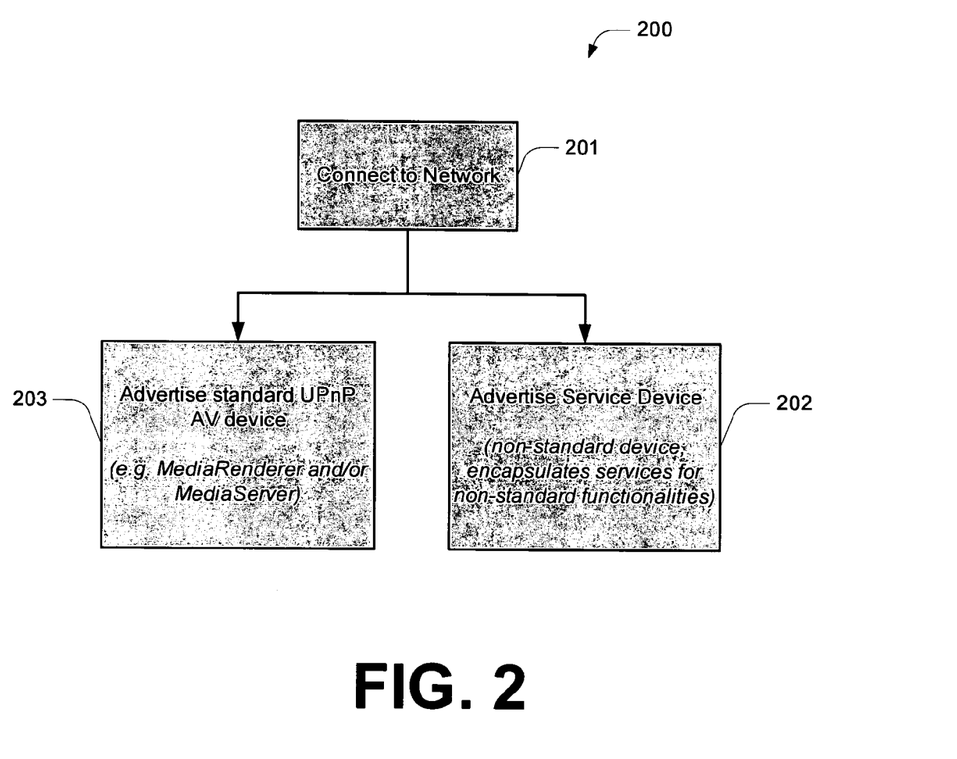
FIG. 2 shows a method according to one embodiment.

FIG. 2 illustrates a method 200 according to an embodiment of the present invention. In the present embodiment, method 200 is performed by wireless speaker 101a (or, for that matter, speaker 101b) based on software instructions 115. Step 201 includes connecting to network 106, which may occur substantially in the conventional manner. Step 202 includes advertising a standard digital media playback device, which in the present examples takes the form of a standard UPnP AV media device, more particularly a standard MediaRenderer. This standard UPnP media device is discoverable and controllable in accordance with the Universal Plug and Play Audio and Video (UPnP AV) standard. Step 203 includes advertising a non-standard digital media playback device, which in the present example takes the form of a proprietary UPnP Services Device. The Services Device is discoverable in accordance with the UPnP protocol, although the manner of control (and the services provided) goes beyond the scope of what is provided by way of the UPnP AV standard. That is, the Services Device is controllable in accordance with a non-standard protocol.

As context, the UPnP AV standard is provided by the Digital Living Network Alliance (DLNA). Details of this standard are available from www.dlna.org and www.upnp.org. Although the UPnP AV standard is used as a particular example throughout this specification, it will be appreciated that the general methodologies herein are applicable to other standards.

From the UPnP perspective, a media-specific UPnP device can adopt various roles on a given network, largely in line with the definitions described by DLNA in the roles of a Digital Media Renderer (also referred to as a DMR or MediaRenderer) and Digital Media Server (also referred to as a DMS or MediaServer). The present approach includes adopting a root UPnP device based on the UPnP Basic Device Template, such that the root device is conveniently discoverable via Simple Service Discovery Protocol (SSDP). This root device is configured to advertise at least one standard UPnP media device (for example a MediaRenderer or MediaServer), thereby to fulfill the DLNA standard. In this manner, a standard UPnP AV control device is able to discover, for the relevant device, a standard MediaRenderer and/or MediaServer device (a wireless speaker is, in some embodiments, able to adopt both roles, for example where media is stored in memory). It will be appreciated that, in order to meet DLNA requirements, any instance of a MediaRenderer should provide services including RenderingControl, ConnectionManager and AVTransport, as well as other standard UPnP non-media services. In a similar vein, any instance of MediaServer should provided services including ContentDirectory and ConnectionManager services, as well as other standard UPnP non-media services.

In addition to advertising a standard UPnP MediaRenderer and/or Media Server, the present approach includes advertising a proprietary Services Device via the root device. Non-standard (e.g. advanced) services and devices can, by encapsulation in the Services Device, effectively be added to the root device without modification to the standard UPnP device or service descriptions. This approach is particularly advantageous in the sense that additional advanced functionalities may be implemented whilst, at the same time, avoiding the need for future compliance with respect to the standard UPnP AV standard control protocol (other than regression testing).

Figure 3:
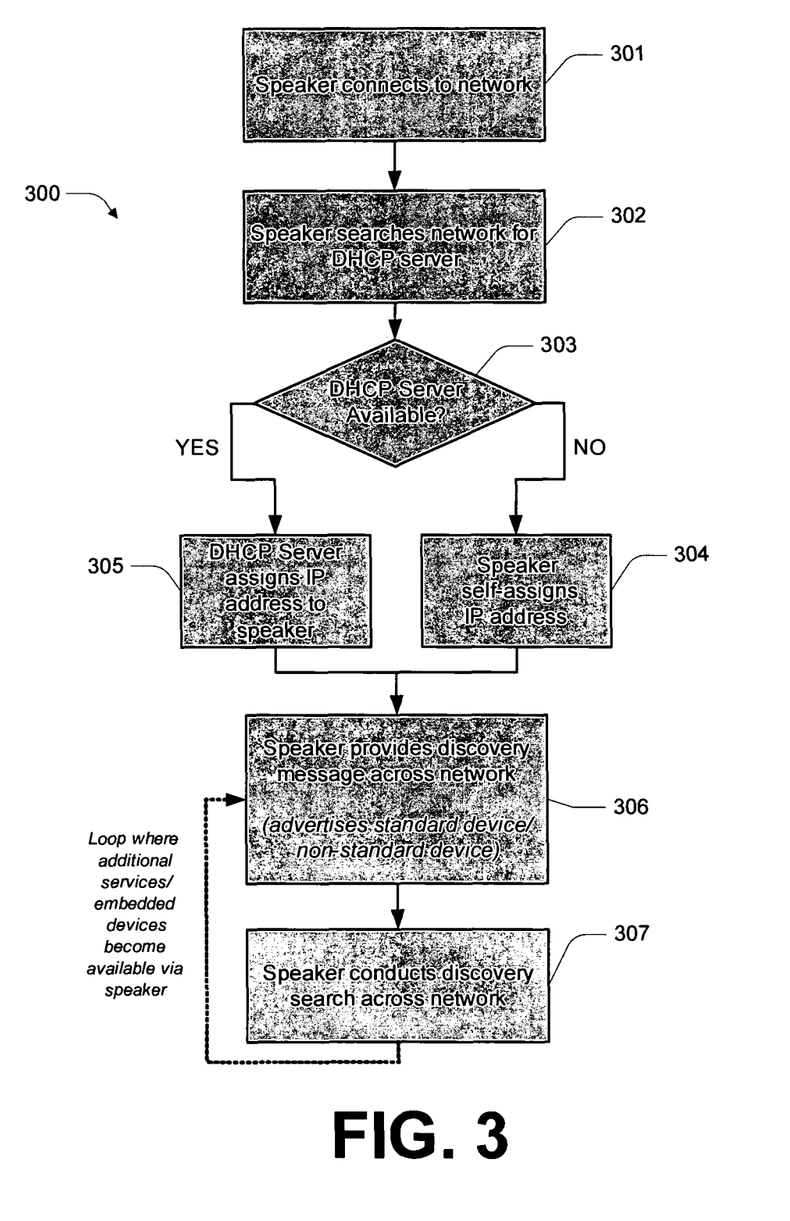
FIG. 3 shows a method according to one embodiment.

In the present embodiments, advertisement occurs subject to a discovery process in accordance with the UPnP protocol. To this end, a more detailed variation on method 200 is shown in FIG. 3, in the form of method 300. Wireless speaker 101a connects to network 106 at step 301. Wireless speaker 101a implements a Dynamic Host Configuration Protocol (DHCP) client, which searches for a DHCP server at step 302. Such a server is generally responsible for the assignment of IP addresses across a network, such as network 106. If, at decision 303, no DHCP server is available, wireless speaker subsystem 101a self-assigns an IP address at step 304. Otherwise, an available DHCP server assigns an IP address to wireless speaker 101a at step 305. In either case, the IP address assigned is used by wireless speaker 101a in subsequent network operations.

Once an IP address is assigned, wireless speaker 101a advertises itself across network 106 at step 306 (in the present circumstances, this includes steps 202 and 203 disclosed above). In particular, wireless speaker 101a provides a discovery message that communicates to other devices on network 106 a relatively small data packet indicative of wireless speaker 101a. For example: data indicative of a type or identifier, and a URL indicative of a location from which more detailed information is available. In the present embodiment the data packet includes the wireless speaker subsystem's MAC address.

Step 307 includes conducting a discovery search across network 106 for devices of interest—such as other wireless speaker subsystems or groups representative of wireless audio systems (such as virtual devices allowing control of a plurality of physical wireless speaker subsystems that operate as a grouped speaker set). The discovery search includes the provision of a probe frame, and in response to this probe frame a similar discovery message to that mentioned above is provided by each complementarily discoverable device on network 106 to wireless speaker 101a.

In some cases, step 306 is repeated at a later point in time. For example, in one embodiment step 306, on a first occasion, includes advertising the Services Device, and on a second occasion includes advertising the standard MediaRenderer. The ordering of these varies between embodiments. However, it is permissible however to just advertise the Services Device where normal UPnP Services are unavailable—this might be during initial boot up of the speaker or where initial first-run configuration is required (e.g. to configure networking and group structure).

In some embodiments, media server 103 is configured to perform a method generally along the lines of method 300. However, rather than advertising a standard MediaRenderer, it advertises a standard MediaServer. In one embodiment media server 103 includes a cradle for connecting a personal media player (such as an MP3 player) to network 205, such that media stored on that player is made available for playback via speaker 101a and 101b. Although the examples herein focus on dual control functionality in media playback devices, such as wireless speakers, it will be appreciated that some embodiments provide such functionalities to media servers.

Control devices 104 and 105 also implement a method along the lines of method 300. It will be appreciated that this effectively results in a discovery protocol whereby each of control devices 104 and 105 discovers wireless speakers 101a and 101b (or, more specifically, none or more of the embedded devices advertised by those speakers), irrespective of the order by which the devices connect to network 106.

As noted above, wireless speaker 101a advertises both a standard UPnP MediaRenderer and the Services Device. The Services Device provides encapsulation for non-standard service extensions, and such embedded services and devices can be added to the Services Device without modification to the standard UPnP Device or Service descriptions. In the context of the present examples, non-standard services provided by the Services Device might include:

Group Control. In broad terms, this allows multiple speakers to operate as a single set, for example as a 5.1 channel surround speaker set.

Zone Control. In broad terms, this allows multiple groups of speakers to operate as a single zone. For example, existing speaker sets defined by groups are linked together, for example to allow synchronized playback across a plurality of groups.

Basic Rendering. In broad terms, this governs a non-standard approach to rendering content. For example, in some cases this allows implementation of a proprietary or otherwise non-standard synchronization protocol.

Surround Sound. This allows various surround sound control functionalities to be implemented within a group. For example, each speaker within a group takes on a role defined within a predetermined surround sound arrangement (such as a 5.1 channel arrangement). In this manner, by way of illustration, a "front left" speaker renders only a portion of a stream that is designated for the "front left" speaker.

Additional discussion of how individual speakers might be arranged into a stereo pair (or a group/zone more generally) is provided in PCT Patent Application No. PCT/AU2007/001573.

For the sake of a simple example, assume that the Services Device provides advanced functionalities that allow speakers 101a and 101b to operate as a stereo pair. That is, a stereo audio file is able to be rendered by these speakers such that one plays a left-channel signal and the other synchronously plays a right-channel signal. This stereo pair is controlled (and optionally configured) in accordance with a non-standard media control protocol, allowing for control that goes beyond the UPnP standard (for example, left/right balance adjustment, stereo widening, and so on). This non-standard control protocol is implemented by advanced control device 105. For example, this control device and the speakers might share a common manufacturer, or be otherwise designed to be specifically compatible one another.

In the context of the present example, control device 105 is used to control playback of audio via the stereo pair defined by speakers 101a and 101b, and coordinate functions relating to the group relationship between these individual speakers in the context of the pair. On the other hand, such control is not able to be achieved by way of standard control device 104, which is only configured to implement the standard UPnP AV media control protocol. However, it will be appreciated from the discussion above that standard control device 104 is able to discover, in the expected and conventional manner, a standard MediaRenderer device corresponding to each of speakers 101a and 101b. In this manner, the standard control device is able to coordinate playback of media at either of these speakers.

As generally discussed in PCT/AU2007/001573, in some embodiments a virtual device may be defined for a stereo speaker pair, or other group/zone defined by a plurality of speakers. In some embodiment, such a virtual device is defined in a similar manner to the individual speakers, such that a standard control device is able to discover a standard MediaRenderer (which is in fact representative of the two speakers, allowing the pair to be controlled as a single standard MediaRenderer). In such a case, a virtual device (a group or a zone) does not have a conventional hardware manifestation in the sense that the wireless audio system includes several individual wireless speaker subsystems. However, the standard and non-standard devices advertised by such a virtual device do in effect share common hardware. Virtual devices are discoverable on a network in the same way as physical devices, and physical devices communicate with virtual devices as they would with other physical devices. In the present embodiment a virtual device has its own IP address. In other embodiments however a virtual device does not have IP addresses, for example as a result of a lower-level protocol running atop that virtual device. In some embodiments a virtual device includes one or more virtual devices, and the virtual device has an IP address whilst the virtual devices may or may not have respective IP addresses.

To provide a practical example of where dual-control in the present context might be particularly useful, consider a consumer with a particular interest in high-quality audio. This consumer purchases a wireless audio system having a number of advanced functionalities, allowing for surround sound configuration and the like. For the sake of example, assume that the relevant wireless audio system implements dual control functionality as described herein. The user typically makes use of an advanced control device that was packaged with the wireless audio system, so that the advanced functionalities can be used. However, a visitor wishes to share with the consumer an audio track contained on a UPnP enabled cellular telephone (or perhaps another portable device), which maintains software to allow it to operate as a standard UPnP control device (and thereby control other devices in accordance with the media control protocol of the UPnP AV standard). The visitor is able to discover a speaker on which to playback the relevant track, due to the availability of standard UPnP MediaRenderer devices. In this manner, a rudimentary control device (i.e. the cellular telephone) may be used to achieve basic playback of audio via an advanced wireless audio system.

Figure 4:
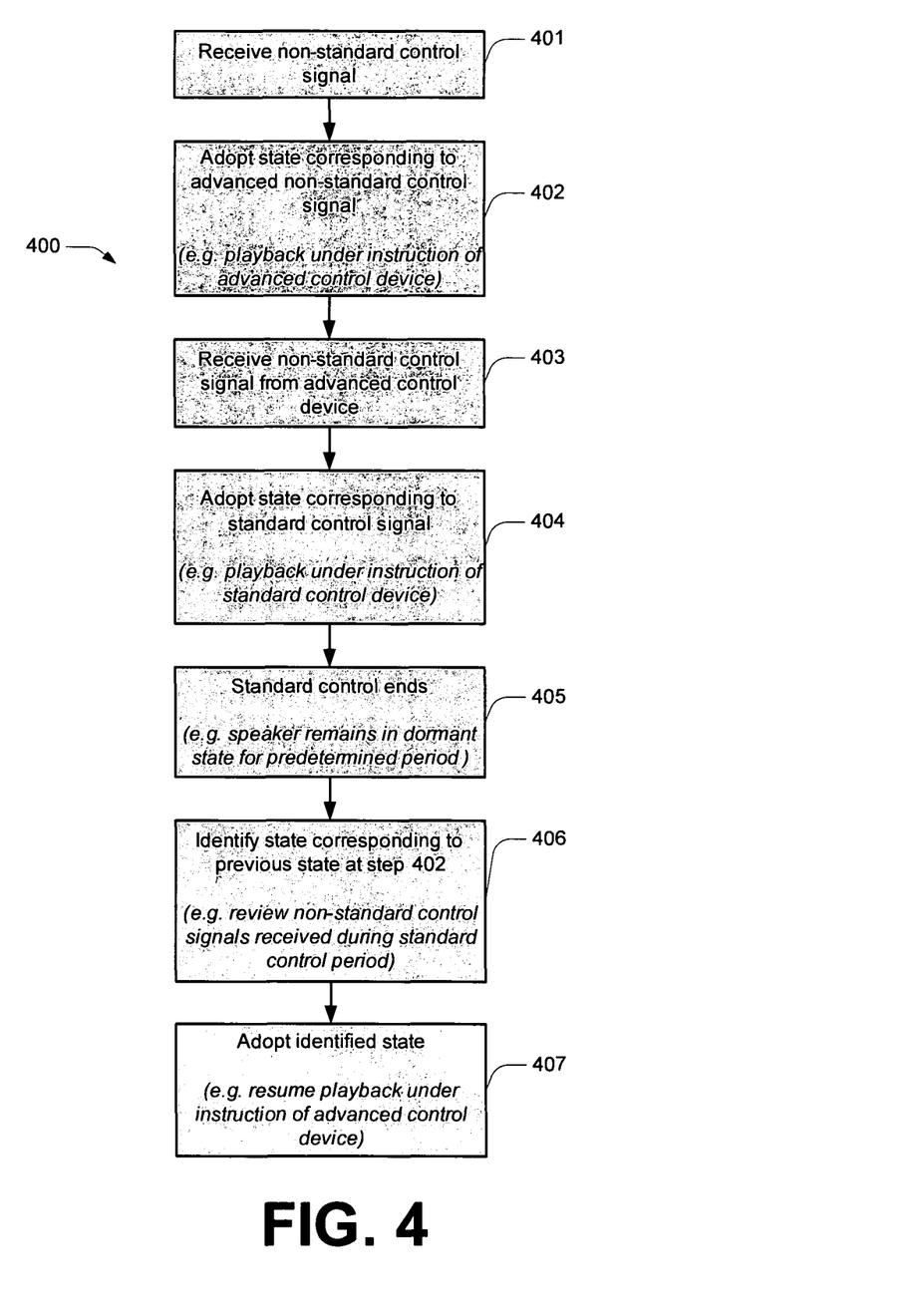
FIG. 4 shows a method according to one embodiment.

In some cases, there may be a conflict between commands provided by standard control device 104 and advanced control device 105. FIG. 4 illustrates a method 400 for managing such a conflict according to one embodiment. In overview, a control signal received in accordance with the standard media control protocol is prioritized over a control signal received in accordance with the non-standard media control protocol. More particularly, a control signal received in accordance with the standard media control protocol is temporarily prioritized over one or more control signals received in accordance with the non-standard media control protocol.

Method 400 commences at step 401, where a wireless speaker receives a first control signal in accordance with the non-standard media control protocol. This is a relatively arbitrary starting point, and might, for example, include a speaker being under instruction to playback audio in the context of a group or zone, either as a master or a slave device. At step 402, that speaker adopts a first state corresponding to the first control signal. For example, that state might include rendering a stream of digital media from a particular source based on a particular synchronization protocol at a given volume. Subsequently, at step 403, the speaker receives a second control signal in accordance with the standard UPnP AV media control protocol, and step 404 includes being responsive to the second control signal for adopting a second state corresponding to the second control signal. For example, where standard control device 104 provides an instruction to playback a given audio track available on network 106, the wireless speaker ceases what it was doing, and commences playing back that audio track at a volume determined by the standard control device. If the speaker was operating as part of a group or zone, that ceases upon adopting this second state. Step 405 includes receiving, in accordance with the standard media control protocol, a third control signal indicative of an instruction to adopt a dormant state, or otherwise realizing a timeout condition. In either event, the crux of step 405 is an assumption or realization that standard control device 104 is no longer taking control of the relevant speaker. Responsive to this, the speaker seeks to identify a fourth state related to the first state at 406. For example, where the relevant speaker was previously operating as part of a group or zone, it attempts to identify that group or zone, and re-join. This is in some embodiments achieved by analyzing UPnP commands provided to the speaker in accordance with the non-standard media control protocol during the period of time during which the standard control device was in control, which are optionally buffered in internal memory. If a relevant fourth state is able to be identified, and optionally subject to a final check of predefined exception conditions (i.e. whether it is reasonable to adopt the identified state), the speaker adopts the fourth state.

To summarize the above changes of state in a simple manner, a speaker initially operates under the control of a non-standard control point, for example playing back audio as part of a speaker set. A standard control point then attempts to takes control of the speaker, which it is able to do. From that point, the speaker behaves as instructed by the standard control point. Once that control ends, the speaker re-instates itself under the influence of the non-standard control point, and behaves as it would have were it not for the impact standard control device (optionally be taking into account instructions from the non-standard device that were received, but not implemented due to prioritization of the standard control device).

Whilst the speaker is under control of the standard control device, commands received in accordance with the non-standard protocol are not actioned. However, these may be stored and/or monitored to assist in identification of the fourth state at an appropriate time.

Figure 5:
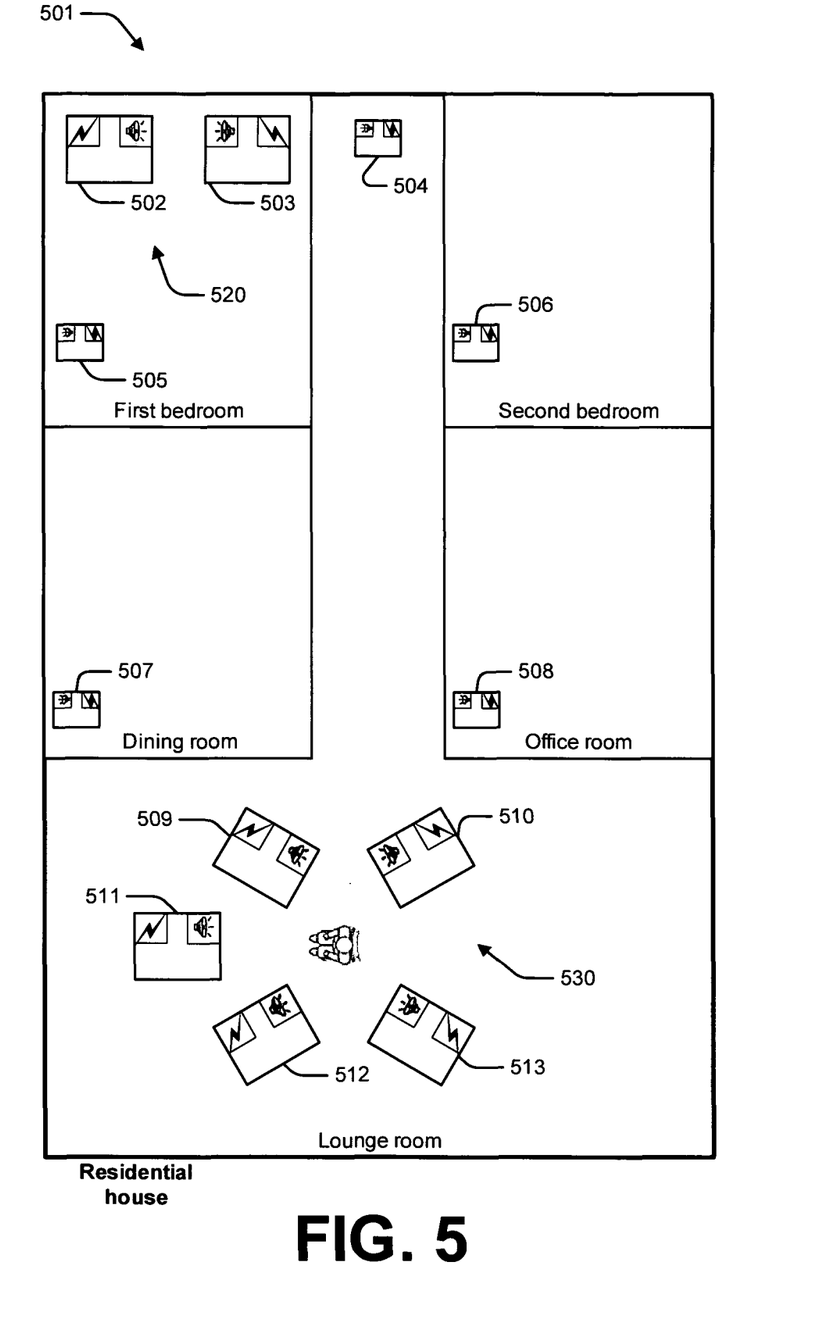
FIG. 5 shows a networked media system according to one embodiment.

To provide an example of how this cross-over between standard and non-standard control occurs in a practical example, consider FIG. 5, which illustrates a residential house 501 having wireless speakers 502 to 513. These are arranged in various groups (for example to provide stereo pairs and/or surround arrangements, as indicated by 520 and 530) and zones. In particular, all of the wireless speakers belong to a common "house zone", which is used to effect playback of a common track synchronously across all of the wireless speakers in house 501.

Initially, for the sake of example, an advanced control device is used to effect playback of media located on a networked media server across the house zone. This is used to create a continuous ambience throughout the house, with music playing on a substantially continuous basis. In a similar manner to an example provided further above, a visitor wishes to share with an audio track contained on a UPnP enabled cellular telephone (or other portable device). This visitor is able to discover a speaker on which to play back the relevant track on one of the speakers, due to the availability of standard UPnP MediaRenderer devices. The manner in which a MediaRenderer is named, in accordance with the UPnP standard, might assist in identifying an appropriate speaker. For example, a given MediaRenderer might be named "Kitchen Speaker" to assist the visitor in identifying it as a speaker in the kitchen. The visitor plays the relevant track through a selected one of the discovered standard MediaRenderers, during which time the concerned speaker or speakers leaves the house zone, and cease playing the ambient music being streamed across that zone. The visitor subsequently stops using the speaker (for example, this might be assumed to have occurred when the speaker adopts a dormant state for a predetermined period of time, such as one minute or thereabouts). At that point in time, the speaker rejoins the family zone, and continues to playback the ambient music synchronously with the other speakers.

To assist in understanding a manner by which dual control might be implemented on a UPnP device, provided below is an exemplary XML device description for a root device, according to one embodiment. This is intended to be indicative only.

```
<?xml version="1.0" encoding="utf-8"?>
<root xmlns= "urn:schemas-upnp-org:device-1-0">
    <specVersion>
        <major>1</major>
        <minor>0</minor>
    <specVersion>
    <URLBase>base URL for all relative URLs</URLBase>
    <device>
        <deviceType>urn:schemas-avegasystems-com:device:AiosDevice:1</deviceType>
        <friendlyName>short user-friendly title</friendlyName>
        <manufacturer>manufacturer name</manufacturer>
        <manufacturerURL>URL to manufacturer site</manufacturerURL>
        <modelDescription>long user-friendly title</modelDescription>
        <modelName>model name</modelName>
        <modelNumber>model number</modelNumber>
        <modelURL>URL to model site</modelURL>
        <serialNumber>manufacturer's serial number</serialNumber>
        <UDN>uuid:UUID</UDN>
        <UPC>Universal Product Code</UPC>
        <iconList>
            <icon>
                <mimetype>image/format</mimetype>
                <width>horizontal pixels</width>
                <height>vertical pixels</height>
                <depth>color depth</depth>
                <url>URL to icon</url>
            </icon>
            XML to declare other icons, if any, goes here
        </iconList>
        <serviceList>
        </serviceList>
        <deviceList>
        </deviceList>
        <presentationURL>URL for presentation</presentationURL>
    </device>
</root>
```

Provided below is a summary of elements, attributes and values appearing in the device description above. The information here is intended to clarify the intended implementation of the root device according to this exemplary embodiment.

xml: Required for all XML documents.

root: Required. Includes urn:schemas-upnp-org:device-1-0 as the value for the xmlns attribute; this references the UPnP Template Language (described below). Case sensitive and contains all other elements describing the root device as per the UPnP Basic Device Template. Note that URLBase is Optional and will not be included in the present template. Relative URLs are not presently used.

device: Contains the following sub elements:

deviceType: UPnP device type. The root device is a non-standard device and, for the sake of the present example, conforms to the following description: urn:schemas-avegasystems-com:device:AiosDevice:1 where 1 is the integer version number. Period characters in the domain name must be replaced with hyphens in accordance with RFC 2141. The device type suffix must be <=64 chars, not counting the version suffix and separating colon. Single URI.

friendlyName: This aligns with the friendly name defined for any other devices (ie: the MediaRenderer) so presenting a uniform device name. A default friendly name shall be provided as part of the manufacturing configuration data however user changes to this element should be stored separately to the initial factory settings. String. Should be <64 characters.

manufacturer: Manufacturer's name which can be device specific and will be part of the manufacturing configuration data. String. Should be <64 characters.

manufacturerURL: Absolute URL for the manufacturer's web site. This can be device specific and where space on device permits this field shall be included as part of the manufacturing configuration data. Single URL<1024 characters modelDescription: Long description for end user. Where space on the device permits this field shall be included as part of the manufacturing configuration data. String. Should be <128 characters.

modelName: Model name. Where space on the device permits this field shall be included as part of the manufacturing configuration data. String. Should be <32 characters.

modelNumber: Model number. Where space on the device permits this field shall be included as part of the manufacturing configuration data. String. Should be <32 characters.

modelURL: Absolute URL to the web site for model. Where space on the device permits this field shall be included as part of the manufacturing configuration data. Single URL <1024 characters.

serialNumber: Serial number. Where space on the device permits this field shall be included as part of the manufacturing configuration data. String. Should be <64 characters.

UDN: Unique Device Name. Universally-unique identifier for the device, generated internally in the same way as other UUIDs. Must be the same over time for a specific device instance (i.e., must survive reboots). Must match the value of the NT header in device discovery messages. Must match the prefix of the USN header in all discovery messages. See UPnPArchitecture Section 1 on device discovery which explains the standard NT and USN headers. Must begin with uuid: followed by a UUID suffix. Single URI, maximum length 68 bytes including "uuid:" portion. Note that UUID formatting hyphens are optional and for consistency shall not normally be included.

UPC: Universal Product Code. Not included for root device.

deviceList: The root shall have an embedded instantiation of at least one device defined by a UPnP Forum working committee in order to satisfy the role as a MediaRenderer or MediaServer, if and only if root device has embedded devices (such as the Services Device). Contains the following sub element:

device: Repeat once for each embedded device defined by a UPnP Forum working committee. If UPnP vendor differentiates device by embedding additional UPnP devices, repeat once for each embedded device. In all cases will contain the same sub elements as defined above for root sub element device. Note that it is essential that all embedded devices have unique and persistent UUIDs, the UUIDs differentiate the individual devices not the physical product.

presentation URL: This element provides an absolute URL to presentation for the device. Single URL<1024 characters.

Provided below is an exemplary XML device description for an Services Device, according to one embodiment. Again, this is intended to be indicative only.

```
<device>
    <deviceType>urn:schemas-avegasystems-com:device:AiosDevice:1</deviceType>
    <friendlyName>short user-friendly title</friendlyName>
    <manufacturer>manufacturer name</manufacturer>
    <manufacturerURL>URL to manufacturer site</manufacturerURL>
    <modelDescription>long user-friendly title</modelDescription>
    <modelName>model name</modelName>
    <modelNumber>model number</modelNumber>
    <modelURL>URL to model site</modelURL>
    <serialNumber>manufacturer's serial number</serialNumber>
    <UDN>uuid:UUID</UDN>
    <UPC>Universal Product Code</UPC>
    <iconList>
        <icon>
            <mimetype>image/format</mimetype>
            <width>horizontal pixels</width>
            <height>vertical pixels</height>
            <depth>color depth</depth>
            <url>URL to icon</url>
        </icon>
        XML to declare other icons, if any, goes here
    </iconList>
    <serviceList>
    </serviceList>
    <deviceList>
    </deviceList>
    <presentationURL>URL for presentation</presentationURL>
</device>
``` iconList: Used for managing icons, and sub-element descriptions follow the UPnP Basic Device Template.

serviceList: In version 1.0 of the UPnP Device Architecture, the serviceList element was required, and it was required to contain at least one service element. These requirements were subsequently rescinded to accommodate the Gateway and Basic device types. If the device has no services, the serviceList element may be omitted entirely, or it may be present but contain no service elements. Appendix A of the UPnP Basic: Device Template suggests that older CPs may enforce the legacy requirement that a device must contain at least one service. Unless a concrete requirement can be determined to do this the root shall not have any associated services, state variables or the serviceList element.

Provided below is a summary of elements, attributes and values appearing in the device description above, some of which being optional. The information here is intended to clarify the intended implementation of the root device according to this exemplary embodiment.

device: Contains the following sub elements:

deviceType: UPnP device type. The Services Device is a non-standard device, and conform to the following description: urn:schemas-avegasystems-com:device: AiosServices:1 where 1 is the integer version number. Period characters in the domain name should be replaced with hyphens in accordance with RFC 2141. The device type suffix must be <=64 chars, not counting the version suffix and separating colon. Single URI.

friendlyName: This element must align with the friendly name defined in the corresponding root element so presenting a uniform device friendly name. String. Should be <64 characters.

manufacturer: This element must align with the manufacturer's name defined in the corresponding root. String. Should be <64 characters.

manufacturerURL: Where populated, this absolute URL for the manufacturer's web site must align with the corresponding Root element. Single URL <1024 characters modelDescription: Where populated, this long description for end user must align with the corresponding root element. String. Should be <128 characters.

modelName: Model name. Where space on the device permits this field shall be included as part of the manufacturing configuration data. String. Should be <32 characters.

modelNumber: Model number. Where space on the device permits this field shall be included as part of the manufacturing configuration data as used to populate the corresponding root element. String. Should be <32 characters.

modelURL: Absolute URL to the web site for model. Where space on the device permits this field shall be included as part of the manufacturing configuration data as used to populate the corresponding root element. Single URL <1024 characters.

serialNumber: Serial number. Where space on the device permits this field shall be included as part of the manufacturing configuration data as used to populate the corresponding root element. String. Should be <64 characters.

UDN: Unique Device Name. Universally-unique identifier for the device, generated internally in the same way as other UUIDs. Must be the same over time for a specific device instance (i.e., must survive reboots). Must match the value of the NT header in device discovery messages. Must match the prefix of the USN header in all discovery messages. See UPnPArchitecture Section 1 on device discovery which explains the standard NT and USN headers). Must begin with uuid: followed by a UUID suffix. Single URI, maximum length 68 bytes including "uuid:" portion. Note that UUID formatting hyphens are optional and for consistency shall not normally be included.

UPC: Universal Product Code. Not included for AiosServices.

IconList: if and only if the device has one or more icons. Such icons only have meaning for Avega CP applications and as such this and the associated elements can be regarded as a place holder for future use. The existing icons available for MediaServer and MediaRenderer Devices should be sufficient to meet existing CP requirements. DLNA 7.2.28.1 requires two jpg 48×48 & 120×120 and two png 48×48 & 120×120 images. Sub element descriptions must follow the UPnP Basic: Device Template.

serviceList: The Services Device shall exclusively contain non-standard UPriP services (such as Group Control, Zone Control, and others considered above). All standard UPnP Devices and services must only reside within the root <deviceList>. This restriction also applies for any embedded devices within the Services Device. The rationale behind this restriction is to ensure ease of compliance testing for standard UPnP devices. Note that normally there will be at least one non-standard service within the Services Device however an empty service list is permissible. In version 1.0 of the UPnP Device Architecture, the serviceList element was required, and it was required to contain at least one service element. These requirements were subsequently rescinded to accommodate the Gateway and Basic device types. If the device has no services, the serviceList element may be omitted entirely, or it may be present but contain no service elements. Appendix A of the UPnP Basic: Device Template suggests that older CPs may enforce the legacy requirement that a device must contain at least one service.

deviceList: if and only if root device has embedded devices. Contains the following sub elements:

device: Repeat once for each embedded device defined by a UPnP Forum working committee. If UPnP vendor differentiates device by embedding additional UPnP devices, repeat once for each embedded device. In all cases will contain the same sub elements as defined above for root sub element device. Note that it is essential that all embedded devices have unique and persistent UUIDs, the UUIDs differentiate the individual devices not the physical product.

presentation URL: This element provides an absolute URL to presentation for the device. Single URL <1024 characters.

It should be appreciated that the above examples are provided primarily to assist in understanding the implementation of a particular embodiment, and, should not be regarded as necessarily limiting in any way.

Figure 6:
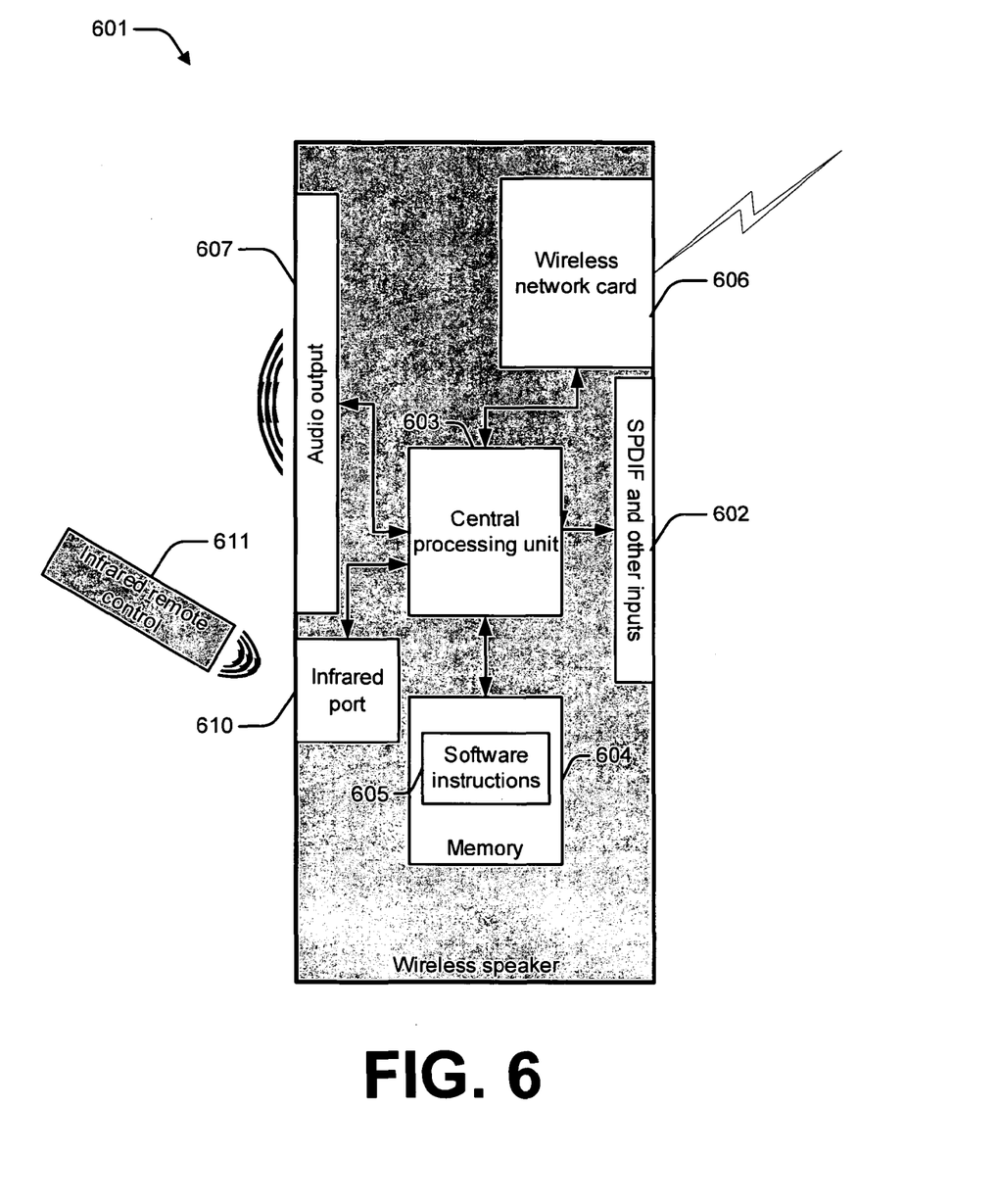
FIG. 6 shows a wireless speaker subsystem unit according to one embodiment.

FIG. 6 shows a wireless speaker subsystem 601, which is appropriate for use in the above embodiments. Wireless speaker subsystem 601 includes an input array 602 for receiving audio signals. Array 602 includes a SPDIF input, along with various other standard and proprietary digital audio inputs. In some instances array 602 includes one or more analogue audio inputs, in which case wireless speaker subsystem 601 includes an analogue to digital converter for converting analogue audio signals into digital form. Once received (and where necessary digitized) the audio signals are processed by a processing unit, e.g., a central processing unit (CPU) 603, which operates in conjunction with memory 604. Memory 604 includes software instructions 605 which, among other functions, allow wireless speaker subsystem 601 to perform methods described herein. It is noted that not all instructions required for performing these methods need be in memory 604 at a given time.

Wireless speaker subsystem 601 is, for the sake of example, configured to be a group leader, and presents a virtual interface for a wireless audio system, and in this manner also becomes responsible for fetching media from a server, or in the case of an SPDIF stream, partially recovering that stream from a digital input. Data indicative of this media or stream is then distributed to the other devices in the group. CPU 603 is responsible for administering playback of a received audio signal. In a broad sense, this includes two distinct tasks. Firstly, using a wireless network interface 606, providing instructions to other wireless speaker subsystems to play respective components of the audio signal. Secondly, using an audio output 607 (which in some embodiments includes one or more speaker cones), playing back the intended center wireless speaker subsystem component of the audio signal. There are, of course, detailed issues of rendering and synchronization, and these fall beyond the scope of the present disclosure.

Wireless speaker subsystem 601 also includes an infrared port 610. This infrared port receives infrared control signals from a compatible infrared remote controller 611. In this manner, the speaker (and, in some cases, the group for which the speaker is leader) is able to be controlled by infrared remote as well as an 802.11 wireless remote (such as control devices 104 and 105 described above).

It will be appreciated that the disclosure above provides various advantageous systems and method for providing dual control functionality in a networked media device. In particular, the methodologies described herein allow such a device to provide non-standard advanced functionalities in appropriate situations, without necessarily prejudicing interoperability with standard control devices.

Although embodiments are described herein by reference to wireless speaker subsystems, it will be appreciated that in other embodiments other wireless media renderers are used. For example, wireless video units that receive over a wireless network data indicative of video and provide that video via a video output such as an LCD screen or an analogue or digital connection port.

Additionally, although the above embodiments have been described by reference to wireless networking, in some embodiments alternate networking arrangements are used such as wire-based Ethernet networks and power line networks. It will be appreciated that embodiments of the invention described by reference to wireless networking are equally applicable to these other networking arrangements.

It should be appreciated that although the invention has been described in the context of the IEEE 802.11 standard, the invention is not limited to such contexts and may be utilized in various other applications and systems, for example in other systems that use OFDM. OFDM is one example of a multicarrier system in which the signal for transmission is split into a set of subcarriers. The invention may also be applicable to other wireless receivers that use multicarriers.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device" and "STA" may be used interchangeably to describe any of those multiple other electronic devices, which may have the capability to be moved and still communicate, though movement is not a requirement. However, the scope of the invention is not limited to devices that are labeled with those terms.

While an embodiment has been described for operation in an OFDM receiver with RF frequencies in the 5 GHz range and 2.4 GHz range (the 802.11a and 802.11g variants of the IEEE 802.11 standard), the invention may be embodied in receivers and transceivers operating in other RF frequency ranges. Furthermore, while a transceiver embodiment for operation conforming to the IEEE 802.11 OFDM standards has been described, the invention may be embodied in transceivers conforming to other standards and for other applications, including, for example other WLAN standards and other wireless standards. Applications that can be accommodated include IEEE 802.11a COFDM wireless LANs and links, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable medium encoded with computer-executable code.

Furthermore, a computer-readable medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable medium encoded with a set of instructions, e.g., a computer program that are for execution on one or more processors, e.g., one or more processors that are part of a wireless speaker subsystem unit or other wireless media rendering device. Thus, as will be appreciated by those skilled in the art, embodiments of the present invention may be embodied as a method, an apparatus such as a special purpose apparatus, an apparatus such as a data processing system, or a computer-readable medium, e.g., a computer program product. The computer-readable medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of computer-readable medium (e.g., a computer program product on a computer-readable storage medium) encoded with computer-readable program code embodied in the medium.

The software may further be transmitted or received over a network via a network interface device. While the computer-readable medium is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by one or more of the processors and that cause the one or more processors to perform any one or more of the methodologies of the present invention. A computer-readable medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may take the form of acoustic or light waves, such as those generated during radio wave and infrared data communications. For example, the term "computer-readable medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

"Variants of the IEEE 802.11 standard" as used herein means the variants and proposed variants of the IEEE 802.11 standard. Variants are versions defined in clauses of the standard and proposed amendments of the standard.

It should be appreciated that although the invention has been described in the context of variants of the IEEE 802.11 standard, the invention is not limited to such contexts and may be utilized in various wireless and non-wireless network applications and systems.

In one embodiment the SPDIF enabled device becomes the leader. In some embodiments, the group and the media source will not be implicitly linked together, so it may be possible for one device to have the SPDIF input and another to provide the streaming source from SPDIF.

A networked digital media device may be connected through any form of computer network including networks with wired and wireless physical layers and networks consisting of multiple physical layers. The network through which the digital media device is connected does not affect the operation of the group other than to partially vary the extent to which synchronous playback is possible.

While in most of the description above, a set of wireless speakers is used as an example of a networked digital media player, the invention is not limited to wireless speakers. Those in the art would readily be able to modify the description provided herein for wireless speakers and apply the methods and apparatuses to other discrete media devices. Thus while in one embodiments, some of the media devices include a radio interface and the network includes a wireless network, in general, the invention is applicable to media devices that can connect to a computer network. The description is provided in terms of wireless speakers in order to keep the description simple and not obscure the inventive concepts.

Furthermore, in most of the description above, a wireless audio system is used as an example of a networked digital media playback system—i.e., as an example of a system that allows one or more devices connected via a computer network to render digital media, the invention is not limited to a wireless audio system. Those of ordinary skill in the art would readily be able to modify the description provided for wireless audio systems herein and apply the methods and apparatuses to other digital media playback systems. The description is provided in terms of wireless speakers and a wireless audio system in order to keep the description simple and not obscure the inventive concepts.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A method performed by a networked digital media device for providing dual-control functionality, the method including the steps of:
   advertising a standard digital media playback device, the standard digital media playback device being discoverable and controllable by a standard control device in accordance with a standard media control protocol;
   (ii) advertising a non-standard digital media playback device, the non-standard device being discoverable and controllable by a non-standard control device in accordance with a non-standard media control protocol;
   (iii) receiving, in accordance with the non-standard media control protocol, a first control signal;
   (iv) being responsive to the first control signal for adopting a first state corresponding to the first control signal;
   (v) receiving, in accordance with the standard media control protocol, a second control signal;
   (vi) being responsive to the second control signal for adopting a second state corresponding to the second control signal,
   (vii) being responsive to a timeout condition, or a third control signal indicative of an instruction to adopt a dormant state, for identifying a fourth state related to the first state; and
   (viii) selectively adopting the fourth state;
   wherein the standard digital media playback device and the non-standard digital media playback device share common hardware.

2. A method according to claim 1 wherein the standard and non-standard devices are embedded devices of a root device.

3. A method according to claim 1 wherein the standard digital media playback device and the non-standard digital media playback device are each advertised in accordance with a common open connectivity protocol.

4. A method according to claim 3 wherein the common open connectivity protocol is UPnP.

5. A method according to claim 1 wherein the standard media control protocol is compliant with the UPnP AV standard.

6. A method according to claim 1 wherein the non-standard multimedia protocol provides control access to one or more advanced services.

7. A method according to claim 6 wherein the one or more advanced services relate to group and/or zone interoperability, or to surround sound functionality.

8. A method according to claim 1 wherein the non-standard device is an embedded services device for encapsulating one or more non-standard UPnP services.

9. A method according to claim 8 wherein the one or more non-standard UPnP services relate to group and/or zone interoperability, or to surround sound functionality.

10. A method according to claim 1 wherein the networked digital media device is a virtual device representative of a networked media system including by a plurality of distributed hardware devices.

11. A method according to claim 1 wherein a control signal received in accordance with the standard media control protocol is prioritised over a control signal received in accordance with the non-standard media control protocol.

12. A method according to claim 1 wherein a control signal received in accordance with the standard media control protocol is temporarily prioritised over one or more control signals received in accordance with the non-standard media control protocol.

13. A method according to claim 1 including receiving, in accordance with the standard media control protocol, the third control signal.

14. A method according to claim 1 wherein the networked media playback device is a networked speaker subsystem unit.

15. A method according to claim 14 wherein the networked media playback device is a wireless speaker subsystem unit.

16. A method according to claim 15 wherein the common hardware includes a network device for receiving streamed media data, a processor for rendering that streamed media data, and an analogue output for providing analogue data based on the rendering of the streamed media data.

17. A method according to claim 1 wherein the networked media device is media server.

18. A networked digital media device for providing dual-control functionality, the device being configured to:
(i) advertise a standard digital media playback device, the standard digital media playback device being discoverable and controllable by a standard control device in accordance with a standard media control protocol;
(ii) advertise a non-standard digital media playback device, the non-standard device being discoverable and controllable by a non-standard control device in accordance with a non-standard media control protocol;
(iii) receive, in accordance with the non-standard media control protocol, a first control signal;
(iv) in response to the first control signal, adopt a first state corresponding to the first control signal;
(v) receive, in accordance with the standard media control protocol, a second control signal;
(vi) in response to the second control signal, adopt a second state corresponding to the second control signal;
(vii) in response to a timeout condition, or a third control signal indicative of an instruction to adopt a dormant state, identify a fourth state related to the first state; and
(viii) selectively adopt the fourth state;
wherein the standard digital media playback device and the non-standard digital media playback device share common hardware of the networked digital media device.

19. A media playback unit including:
a networking interface for connecting to a computer network over which streamed media data is transported for rendering at distributed locations; and
one or more processors configured for:
carrying out a discovery process on the computer network for allowing mutual discovery of the device, none or more complementary devices, and none or more complimentary multimedia systems;
advertising a standard digital media playback device, the standard digital media playback device being discoverable and controllable by a standard control device in accordance with a standard media control protocol; and
advertising a non-standard digital media playback device, the non-standard device being discoverable and controllable by a non-standard control device in accordance with a non-standard media control protocol;
receiving, in accordance with the non-standard media control protocol, a first control signal;
being responsive to the first control signal for adopting a first state corresponding to the first control signal;
receiving, in accordance with the standard media control protocol, a second control signal;
being responsive to the second control signal for adopting a second state corresponding to the second control signal;
being responsive to a timeout condition, or a third control signal indicative of an instruction to adopt a dormant state, for identifying a fourth state related to the first state; and selectively adopting the fourth state.

* * * * *

UNITED STATES PATENT AND TRADEMARK OFFICE
CERTIFICATE OF CORRECTION

| | | |
|---|---|---|
| PATENT NO. | : 8,554,895 B2 | Page 1 of 1 |
| APPLICATION NO. | : 12/811297 | |
| DATED | : October 8, 2013 | |
| INVENTOR(S) | : Max Gordon Ramsay | |

It is certified that error appears in the above-identified patent and that said Letters Patent is hereby corrected as shown below:

On the Title Page

Item (87) PCT Pub. No.
Change "WO2009/086660" to --WO2009/086600--

Signed and Sealed this
Eleventh Day of February, 2014

Michelle K. Lee
*Deputy Director of the United States Patent and Trademark Office*